(12) United States Patent
Quigley et al.

(10) Patent No.: US 6,253,131 B1
(45) Date of Patent: Jun. 26, 2001

(54) STEERING WHEEL ELECTRONIC INTERFACE

(75) Inventors: Jon M. Quigley, Mount Vernon; Richard P. Bertalan, Arlington; Jeffrey E. Bargewell, Burlington; Lew E. Plummer, LaConner; Ted Scherzinger, Redmond, all of WA (US)

(73) Assignee: PACCAR Inc, Bellevue, WA (US)

( * ) Notice: Subject to any disclaimer, the term of this patent is extended or adjusted under 35 U.S.C. 154(b) by 0 days.

(21) Appl. No.: 09/392,075

(22) Filed: Sep. 8, 1999

(51) Int. Cl.⁷ ....................................... G09F 9/00
(52) U.S. Cl. ............................ 701/36; 340/461; 455/89
(58) Field of Search ....................... 701/36, 41; 340/461, 340/426, 438; 455/89, 603

(56) References Cited

U.S. PATENT DOCUMENTS

| | | | |
|---|---|---|---|
| 4,607,898 | 8/1986 | Reighard et al. | 439/217 |
| 4,628,310 * | 12/1986 | Reighard et al. | 340/825.72 |
| 4,635,029 | 1/1987 | Yamada | 359/143 |
| 4,696,523 | 9/1987 | Schauer et al. | 439/11 |
| 4,697,092 * | 9/1987 | Roggendorf et al. | 307/10.1 |
| 4,766,326 * | 8/1988 | Hayashi et al. | 307/10.1 |
| 4,824,396 | 4/1989 | Sasaki et al. | 439/475 |
| 4,838,803 | 6/1989 | Kondo | 439/164 |
| 4,988,973 * | 1/1991 | Innui et al. | 340/425.5 |
| 5,413,492 | 5/1995 | Obata | 439/164 |
| 5,429,517 | 7/1995 | Bolen | 439/164 |
| 5,453,929 | 9/1995 | Stove | 701/1 |
| 5,555,502 | 9/1996 | Opel | 701/36 |
| 5,580,259 | 12/1996 | Bolen et al. | 439/164 |
| 5,601,437 | 2/1997 | Harvey et al. | 439/15 |
| 5,669,777 | 9/1997 | Matsumoto et al. | 165/47 |
| 5,674,081 | 10/1997 | Hoffmann et al. | 439/164 |
| 5,679,015 | 10/1997 | Schauer | 439/164 |
| 5,749,744 | 5/1998 | Henderson et al. | 439/164 |
| 5,752,843 | 5/1998 | Kawamoto et al. | 439/164 |
| 5,762,506 | 6/1998 | Du-Rocher | 439/164 |
| 5,762,507 | 6/1998 | Mochizuki et al. | 439/164 |
| 5,769,649 | 6/1998 | Welschholz et al. | 439/164 |
| 5,808,374 * | 9/1998 | Miller et al. | 307/10.1 |
| 5,810,606 | 9/1998 | Ballast et al. | 439/15 |
| 5,813,875 | 9/1998 | Ishikawa et al. | 439/164 |
| 5,867,093 * | 2/1999 | Dodd et al. | 340/461 |

* cited by examiner

*Primary Examiner*—William A. Cuchlinski, Jr.
*Assistant Examiner*—Marthe Marc-Coleman
(74) *Attorney, Agent, or Firm*—Christensen O'Connor Johnson Kindness PLLC

(57) ABSTRACT

Method and apparatus for interfacing steering wheel inputs on a steering wheel assembly with electronically-controlled devices in a vehicle. A steering wheel interface module in the steering wheel assembly is connected between the steering wheel inputs and a data communication bus in the steering wheel assembly. The steering wheel inputs provide control information to the steering wheel interface module, which in turn formulates data messages based on the control information and transmits the data messages on the data communication bus in the steering wheel assembly. Preferably, the steering wheel interface module includes a processing unit and a memory in communication with the processing unit. The data messages are formulated by the processing unit in accordance with programmed instructions stored in the memory. The programmed instructions and/or data messages stored in the memory may be modified or supplemented at a later time. The steering wheel interface module may also have a communication connection with one or more outputs on the steering wheel assembly for displaying status information. The data communication bus in the steering wheel assembly is electrically connected through a rotational connection assembly to a data communication bus in the vehicle that conveys the data messages sent by the steering wheel interface module to the electronically-controlled devices in the vehicle.

29 Claims, 4 Drawing Sheets

STEERING WHEEL ELECTRONIC INTERFACE

FIELD OF THE INVENTION

The present invention relates to data communication in a vehicle, and more particularly to data communication interfaces for communicating control data in a vehicle.

BACKGROUND OF THE INVENTION

When a vehicle is driven, it is desirable to keep the driver's attention as close to the road as possible. It is therefore desirable to place frequently-used vehicle controls on the steering wheel to minimize the driver's attention away from the road when adjusting the controls. Such vehicle controls are typically used to control the vehicle's headlights, horn, windshield wipers, cruise control, etc.

With the growth of computer technology, it is now common for electronically-controlled devices in a vehicle to exchange control data or status information via a data communication bus implemented in the vehicle. For heavy-duty vehicle applications, the Society of Automotive Engineers (SAE) has established a number of protocols to help standardize such data communication, e.g., SAE J1708/1587 and SAE J1939. The SAE J1939 protocol is an extended address protocol conforming with the Controller Area Network (CAN) standard that is well-known in the industry.

However, present day steering wheel controls for vehicles in the heavy truck and trailer industry are not configured to take advantage of the vehicle's data communication bus. Currently, steering wheel inputs, such as switches and controls on a truck's steering wheel assembly for controlling headlights, cruise control, windshield wipers, etc., are directly wired to relays in the vehicle that control the respective devices. Present means for wiring the steering wheel inputs to the devices in the vehicle are heavyweight, complex, and do not readily allow for future developments or modifications. Furthermore, changing the steering wheel wiring to accommodate individual preferences for the steering wheel inputs is difficult and expensive.

A need, therefore, exists for a steering wheel electronic interface that reduces the wiring required and increases the flexibility to add or modify functions and controls to the steering wheel inputs without having to redesign the truck electrical system. The present invention is directed to satisfy these needs and other shortcomings in the prior art.

SUMMARY OF THE INVENTION

The present invention provides a steering wheel assembly that interfaces steering wheel inputs with electronically-controlled devices located elsewhere in the vehicle. In accordance with the present invention, a data communication bus is incorporated into the steering wheel assembly. When the steering wheel assembly is installed in a vehicle, the data communication bus in the steering wheel assembly is connected to a data communication bus in the vehicle.

The steering wheel assembly includes a steering wheel interface module connected between the steering wheel inputs and the data communication bus in the steering wheel assembly. The steering wheel inputs provide control information to the steering wheel interface module, which in turn formulates data messages based on the control information. The steering wheel interface module transmits the data messages on the data communication bus in the steering wheel assembly to the data communication bus in the vehicle. The electronically-controlled devices in the vehicle are connected to the data communication bus in the vehicle and receive the data messages sent by the steering wheel interface module. The electronically-controlled devices may also transmit data messages back to the steering wheel interface module. In one embodiment of the invention, the data communication bus in the vehicle is connected to the data communication bus in the steering wheel assembly through a slip ring connection.

The steering wheel interface module preferably includes a processing unit and a memory in communication with the processing unit. The processing unit operates in accordance with programmed instructions in the memory to formulate the data messages that are transmitted on the data communication bus in the steering wheel assembly. The data messages may be embedded in the programmed instructions or may be in a collection of data messages stored in the memory and accessed by the processing unit when the control information is received from the steering wheel inputs.

The programmed instructions and data messages may be stored in the memory at the time the steering wheel interface module is manufactured, or may be programmed in the memory later in the vehicle production process or in servicing of the vehicle. In that regard, the processing unit includes a communication port for receiving the programmed instructions and/or data messages to be stored in the memory. Preferably, the processing unit receives the programmed instructions and/or data messages via the data communication bus in the steering wheel assembly.

The steering wheel interface module may further include a bus interface transceiver in communication with the processing unit and the data communication bus in the steering wheel assembly. Data messages formulated by the processing unit are communicated to the bus interface transceiver and transmitted by the bus interface transceiver on the data communication bus. The steering wheel interface module may also have a communication connection with one or more outputs on the steering wheel assembly to display status information.

BRIEF DESCRIPTION OF THE DRAWINGS

The foregoing aspects and many of the attendant advantages of this invention will be more readily appreciated and better understood by reference to the following detailed description, when taken in conjunction with the accompanying drawings, wherein.

DETAILED DESCRIPTION OF THE PREFERRED EMBODIMENT

Figure 1:
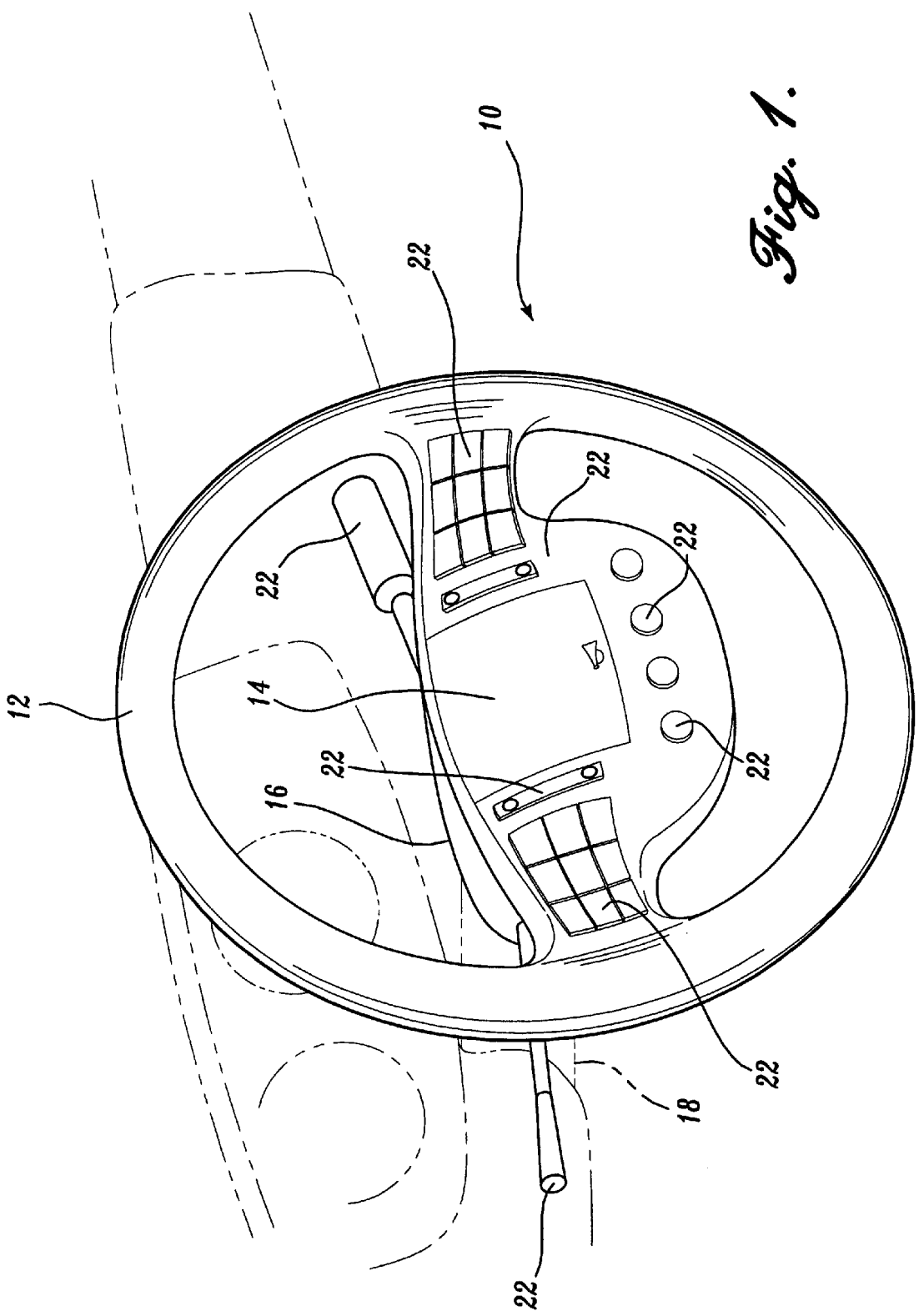
FIG. 1 is a perspective view of a steering wheel assembly constructed in accordance with the present invention.

As shown in FIG. 1, a steering wheel assembly 10 constructed according to the present invention generally comprises an annular steering wheel rim 12 connected by spokes to a central steering wheel hub 14. The steering wheel rim 12 is grasped by the driver of the vehicle when driving. The steering wheel hub 14 is typically formed of a tapered body 16 adapted to be coupled to a steering wheel column 18 in the vehicle. The steering wheel hub 14 houses a center portion of the steering wheel assembly that may hold an air bag, when the vehicle is so equipped. As discussed in more detail below in reference to FIG. 2, the steering wheel hub also houses a steering wheel interface module 20, a data communication bus 24, and a rotational connection assembly 28. The steering wheel interface module 20 interfaces steering wheel inputs 22 on the steering wheel hub 14 with the data communication bus 24 in the steering wheel assembly 10. Since the steering wheel hub 14 is an integral part of the steering wheel assembly 10, the components of the steering wheel assembly that may be housed by the steering wheel hub 14 (e.g., the steering wheel interface module 20, the data communication bus 24, and the rotational connection assembly 28) are generally stated herein to be in the steering wheel assembly 10. Likewise, steering wheel inputs 22 connected to the steering wheel hub 14 are generally stated herein to be on the steering wheel assembly 10 and may be connected anywhere on the steering wheel assembly 10.

Figure 2:
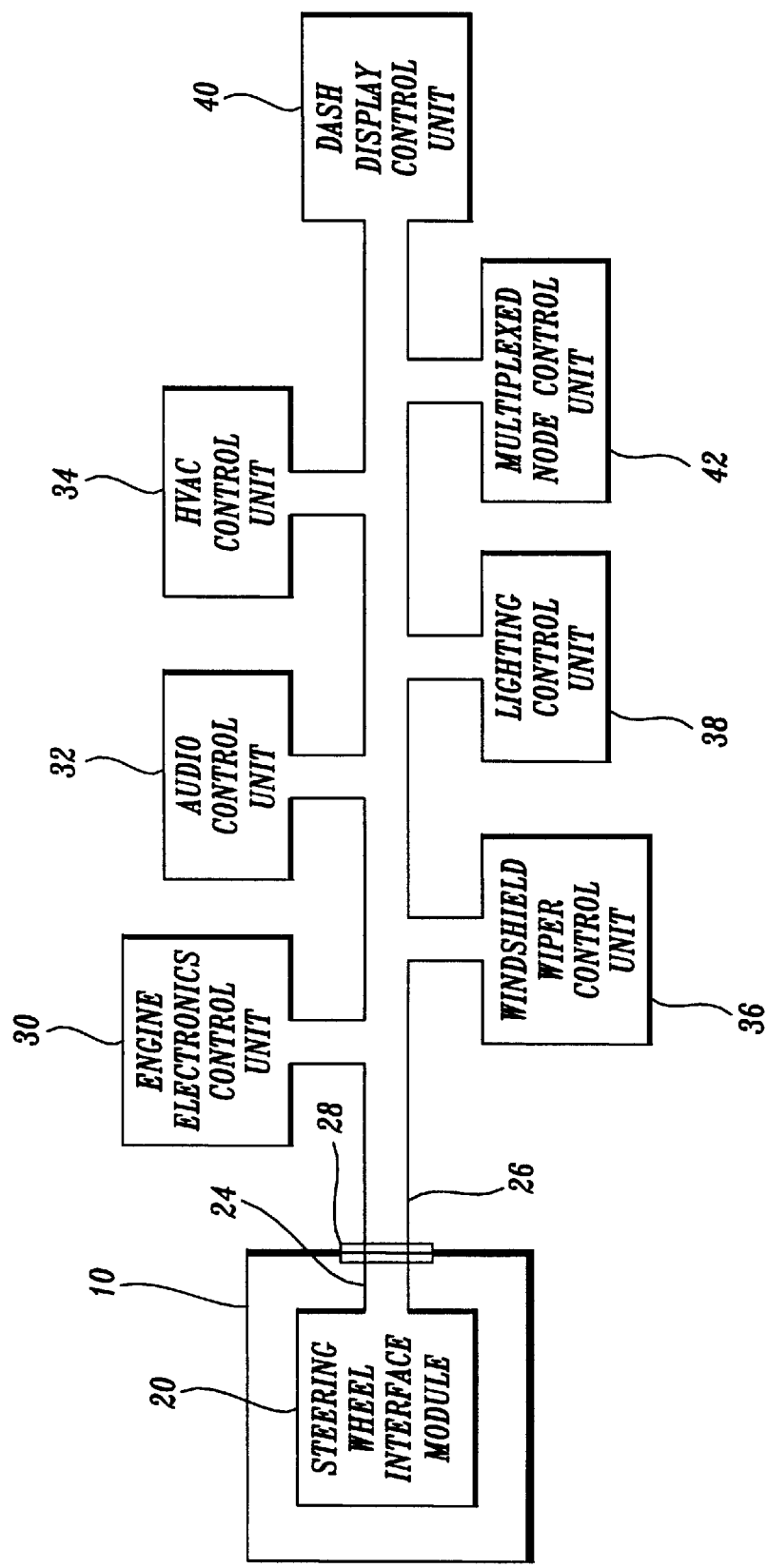
FIG. 2 is a block diagram illustrating a steering wheel assembly as shown in FIG. 1, with a steering wheel interface module in communication with a number of control units in a vehicle via a data communication bus in the steering wheel assembly connected to a data communication bus in the vehicle.

FIG. 2 is a block diagram illustrating the steering wheel assembly 10 shown in FIG. 1. The steering wheel assembly 10 includes a steering wheel interface module 20. A data communication bus 24 incorporated into the steering wheel assembly 10 connects to a data communication bus 26 in the vehicle through a rotational connection assembly 28. The steering wheel interface module 20 is connected to the data communication bus 24, thereby allowing the steering wheel interface module 20 to directly transmit and receive data messages on the data communication bus 24.

In FIG. 2, a number of control units located throughout the vehicle are shown connected to the data communication bus 26. The control units are used to control various aspects of vehicle operation. For example, an engine electronics control unit 30 is used in the vehicle to control aspects of engine operation, including cruise control and compression braking. Other control units shown in FIG. 2 include an audio control unit 32, an HVAC control unit 34, a windshield wiper control unit 36, and a lighting control unit 38. The audio control unit 32 controls the operation of a radio, cassette or CD player, or other audio equipment installed in the vehicle. The HVAC control unit 34 controls the heating, ventilation, and air conditioning within the vehicle. The windshield wiper control unit 36, as the name suggests, controls the vehicle's windshield wipers. The lighting control unit 38 controls the low-beam and high-beam operation of the headlights, as well as interior lighting in the vehicle and/or lighting inside or outside a trailer attached to the vehicle. FIG. 2 also illustrates a dash display control unit 40 connected to the data communication bus 26 for controlling the operation of a display screen or other visual or audible indicators provided on the dash of the vehicle.

The control units connected to the data communication bus 26 may further include multiplexed "regional" node control units (e.g., the multiplexed node control unit 42). The regional control units are used to control a variety of devices in a region of the vehicle, e.g., a chassis module that controls dash components, switches, and lamps in the vehicle, or a trailer node control unit that controls the turn signals, lighting, and suspension in the trailer.

The control units 30, 32, 34, 36, 38, 40, and 42 are considered to be nodes on the data communication bus 26, while the steering wheel interface module 20 is considered to be a node on the data communication bus 24. For purposes of data communication, when the data communication bus 24 is connected to the data communication bus 26 through the rotational connection assembly 28, the data communication buses 24 and 26 preferably act as a single data communication bus. In other words, the data communication buses 24 and 26 are equivalent at the hardware and protocol layers, and data communication through the rotational connection assembly 28 is transparent. Data messages transmitted on the data communication bus 24 are transmitted on the data communication bus 26, and vice versa.

The control units 30, 32, 34, 36, 38, 40, and 42 illustrated in FIG. 2 are shown for illustrative purposes only. Those of ordinary skill in the art will readily recognize that any type of electronically-controlled device in a vehicle may be adapted to connect to a data communication bus in the vehicle to receive and/or transmit control and status information. For example, control units not shown in FIG. 2 that may be connected to the data communication bus 26 include a horn control unit for controlling the sounding of the vehicle's horn, a seat position control unit for controlling motors that position the driver's seat, a mirror position control unit for controlling motors that position the side and/or rear view mirrors of the vehicle, etc.

As will be better understood from the discussion below, the steering wheel assembly 10 uses the steering wheel interface module 20 to interface the steering wheel inputs 22 with the data communication bus 24. The steering wheel interface module 20 monitors or otherwise receives control information from the various switches and controls on the steering wheel assembly 10 (i.e., the steering wheel inputs 22 shown in FIG. 1). When the steering wheel interface module 20 senses that a steering wheel input 22 has been manipulated, the steering wheel interface module 20 formulates a data message that is directly output on the data communication bus 24 in the steering wheel assembly 10 and transmitted to the control unit(s) on the data communication bus 26. The control unit(s) on the data communication bus 26 that correspond to the manipulated steering wheel input receive the data message and act upon the instructions contained therein.

Figure 3:
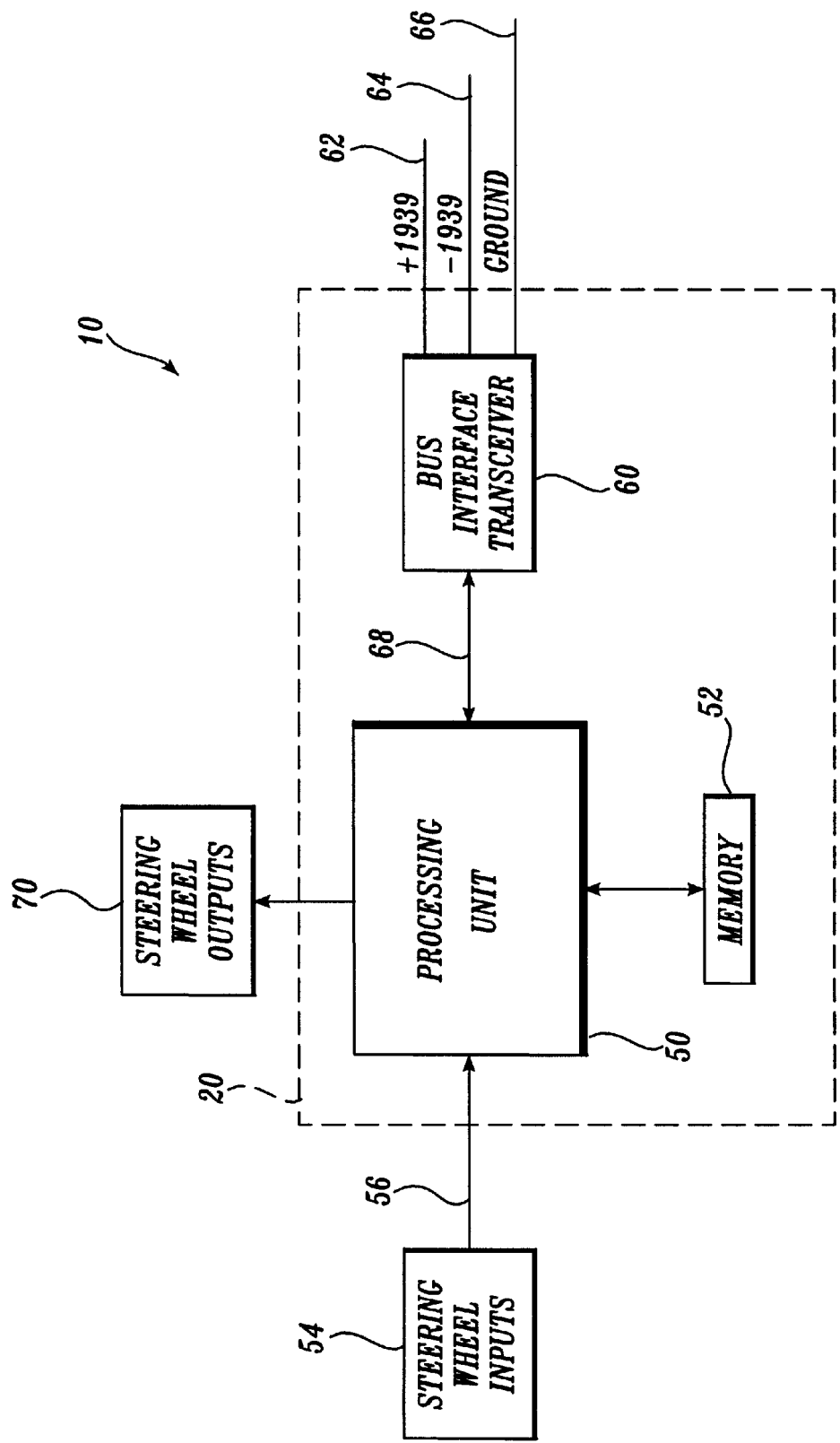
FIG. 3 is a block diagram illustrating the major components of a steering wheel interface module as shown in FIG. 2, with steering wheel inputs and steering wheel outputs connected thereto.

FIG. 3 illustrates the major components of a steering wheel interface module 20 as shown in FIG. 2. In FIG. 3, the steering wheel interface module 20 includes a processing unit 50 in communication with a memory 52. The processing unit 50 operates in accordance with programmed instructions stored in the memory 52. One embodiment of the processing unit 50 uses a C505C microcontroller manufactured by Siemens that has a Controller Area Network (CAN) bus integrated on board. An 18CXXX controller manufactured by Microchip (also having a CAN bus interface) is also suitable for use in the invention. Other embodiments of the invention may use processing units that support other forms of data communication.

The memory 52 may include volatile memory, such as a random-access memory (RAM), and non-volatile memory, such as a read-only memory (ROM or EPROM) or flash memory. The memory 52 may also include other storage devices, such as devices that use optical or magnetic storage media. In an actual embodiment of the invention, the memory 52 is integrated with the processing unit 50.

The programmed instructions in memory 52 that direct the operation of the processing unit 50 may be divided between different types of memory, such as a read-only memory and a flash memory. Basic programmed instructions for scheduling and monitoring of steering wheel inputs 54 on the steering wheel assembly 10 may be stored in the read-only memory as they are not likely to be modified or updated at a future time. Programmed instructions for interpreting and acting upon control information received from the steering wheel inputs 54 may be stored in the flash memory. The data messages formulated by the processing unit 50 and transmitted on the data communication bus 24 are preferably stored in the flash memory and accessed by the processing unit 50 when control information is received from the steering wheel inputs 54. While the flash memory is considered non-volatile in that it does not require continued refreshing of the information stored therein, the flash memory is easily programmed and later reprogrammed to add or modify the functionality of the steering wheel interface module 20. Nevertheless, it is not required that the memory 52 be integrated with the processing unit 50, or that the programmed instructions be divided between different types of memory.

The steering wheel inputs 54 include control inputs on the steering wheel assembly 10 for controlling various aspects of the vehicle operation. The steering wheel inputs 54 may include switches, buttons, levers, keys, etc., and may be located anywhere on the steering wheel assembly 10. For example, the steering wheel inputs 54 may include switches and buttons on the front of the steering wheel hub 14, and levers attached to the side of the steering wheel hub 14, as illustrated by steering wheel inputs 22 shown in FIG. 1. The steering wheel inputs 54 may also include voice-operated controls.

The steering wheel inputs 54 may be permanently connected to the steering wheel assembly 10, or may be configured to releasably attach to the steering wheel assembly 10. In regard to the latter, the steering wheel assembly 10 may include sockets or other releasable electrical connections into which the removable steering wheel inputs may be inserted. Preferably, each of the removable steering wheel inputs includes a coding that is mechanically or electrically read by the steering wheel interface module 20 to identify the function(s) associated with the steering wheel input. Providing removable steering wheel inputs that insert into sockets or otherwise releasably attach to the steering wheel assembly 10 adds flexibility in customizing the steering wheel controls to suit the operator's desires.

In one embodiment of the invention, the steering wheel interface module 20 is mounted in the steering wheel assembly 10 toward the front surface of the steering wheel hub 14. The steering wheel inputs 54 (e.g., the switches and buttons 22 shown in FIG. 1) are mounted through the front surface of the steering wheel hub 14 and attach directly to the steering wheel interface module 20. If removable steering wheel inputs are used, the sockets or other releasable electrical connections into which the steering wheel inputs are inserted may be attached directly to the steering wheel interface module 20.

The steering, wheel inputs 54 shown in FIG. 3 are connected to the processing unit 50 via a communication connection 56. The communication connection 56 may be a series of electrical wires that individually connect each of the steering wheel inputs with a communication port in the processing unit 50. Alternatively, the communication connection 56 may include a multiplexing device that allows the steering wheel inputs 54 to communicate with the processing unit 50 via a single communication port in the processing unit. If the steering wheel inputs 54 are directly attached to the steering wheel interface module 20, the communication connection 56 may include wires printed on an integrated circuit board to which the processing unit 50 is attached.

The steering wheel inputs 54 may also include a combination of buttons or switches with a video screen display. The buttons or switches are used to scroll through various available functions shown on the video screen display and select a function to be implemented by the steering wheel interface module 20. In this manner, a single set of buttons or switches on the steering wheel assembly may be used to control the operation of a wide variety of functions in the vehicle. If the video screen display is not embodied within the steering wheel assembly 10 but instead is located elsewhere in the vehicle, e.g., on the dash, the scrolling of functions shown on the display may be controlled by the dash display control unit 40 shown in FIG. 2. The buttons or switches on the steering wheel assembly 10 communicate with the video screen display via the data communication buses 24 and 26 and the dash display control unit 40.

In one embodiment of the invention, the processing unit 50 receives control information from the steering wheel inputs 54 by monitoring the steering wheel inputs 54 for state changes (e.g., an open switch being closed). In other embodiments of the invention, the processing unit may receive control information from control signals actively sent by the steering wheel inputs 54 to the processing unit 50.

The processing unit 50 interprets control information received from the steering wheel inputs 54 in accordance with programmed instructions that associate functions with each of the steering wheel inputs. For example, the programmed instructions in the memory 52 may associate the vehicle's headlights with a particular steering wheel switch and interpret the closing of the switch as indicating that the headlights should be turned on. The processing unit 50 formulates a data message based on the control information and directly outputs the data message on the data communication bus 24, in this case instructing the lighting control unit 38 on the data communication bus 26 in the vehicle to turn the headlights on.

In FIG. 3, the processing unit 50 outputs data messages on the data communication bus 24 via a bus interface transceiver 60. If necessary, the bus interface transceiver 60 formats the data messages received from the processing unit 50 prior to transmission to conform the data messages to the data transmission protocol that governs communication on the data communication bus 24. For example, in FIG. 3, the data communication bus 24 includes three bus lines 62, 64, and 66 labeled +1939, −1939, and ground, respectively, that conform with the SAE J1939 standard. The bus interface transceiver 60 formats the data messages received from the processing unit 50 in accordance with SAE J1939 protocol. In other embodiments of the invention, the bus interface transceiver 60 may be configured to format data messages for transmission according to other standards, such as SAE J1708/1587, Inter-Integrated Communications (I$^2$C), Universal Serial Bus (USB), etc., depending on the type of data bus used in the steering wheel assembly. Preferably the bus interface transceiver 60 is also configured to receive data messages from the data communication bus 24 and the forward the data messages to the processing unit 50.

The bus interface transceiver 60 communicates with the processing unit 50 via a communication connection 68. The communication connection 68 may include a series of parallel wires that permits parallel communication of data between the processing unit 50 and the bus interface transceiver 60. Alternatively, the electrical connection 68 may be serial communication connection.

A communications driver portion of the bus interface transceiver 60 drives the actual transmission of the data messages on the data communication bus 24. For example, if a J1939 data bus is used in the vehicle, the communications driver portion of the bus interface transceiver 60 sets the voltage levels on the bus lines 62 and 64 in accordance with RS-485 standard. Data messages sent by the processing unit 50 on the data communication bus 24 (via the bus interface transceiver 60) are received by electronic control units connected to the data communication bus 26, as shown in FIG. 2.

The bus interface transceiver 60 may be a single integrated device or may be constructed using various discrete components, e.g., a communications driver and receiver circuit that is separate from a data formatting circuit. The bus interface transceiver 60 may include a memory (e.g., a random-access memory or a register) to temporarily store data messages transmitted or received on the data communication bus 24. The bus interface transceiver 60 may also be integrated with the processing unit 50.

In FIG. 3, the processing unit 50 is also shown in communication with one or more steering wheel outputs 70. The steering wheel outputs 70 may include visual indicators on the steering wheel such as LED or incandescent bulbs, or a video screen display. The steering wheel outputs 70 may also include audible indicators, e.g., a buzzer or speaker, and may be directly connected to the steering wheel interface module 20. The steering wheel outputs 70 are preferably used to indicate the status of electronic devices in the vehicle that are controlled by the steering wheel inputs 54. Status information received by the processing unit 50 from electronic devices on the data communication bus 26 (e.g., from the control units 30, 32, 34, 36, 38 and 40 shown in FIG. 2) may include fault information, such as information that a headlight has burned out. Since the processing unit 50 may not have the capacity to drive the loads of the various steering wheel outputs, the processing unit 50 may communicate with the steering wheel outputs 70 using one or more driver circuits not shown in FIG. 3.

The following provides another example of the processing performed by the present invention. If a steering wheel input designated for controlling the air conditioning unit is manipulated to turn on the air conditioning, the processing unit 50 senses the manipulation of the steering wheel input and formulates a data message instructing the control unit that controls the air conditioning unit (e.g., the HVAC control unit 34 shown in FIG. 2) to turn on the air conditioning. The processing unit 50 may formulate the data message by accessing the appropriate data message from a collection of data messages stored in the memory 52. The processing unit 50 outputs the data message on the data communication bus 24 via the bus interface transceiver 60. The HVAC control unit 34 receives the data message over the data communication bus 26, and in response to the instructions in the data message, the HVAC control unit 34 turns on the air conditioning unit. The HVAC control unit 34 may then transmit a data message back to the steering wheel interface module 20 via the data communication bus 26 and the data communication bus 24 indicating that the air conditioning unit is on. The processing unit 50 receives the data message from the HVAC control unit 34 via the bus interface transceiver 60 and, in response thereto, instructs a steering wheel output, such as a light, to turn on to indicate that the air conditioning unit is presently activated. By incorporating the data communication bus 24 into the steering wheel assembly 10 and connecting the data communication bus 24 to the data communication bus 26, separate wiring from the steering wheel input to the HVAC control unit 34 is eliminated.

Only the major components of the steering wheel interface module 20 are illustrated in FIG. 3. Accordingly, there may be other aspects of the steering wheel interface module 20 not shown in FIG. 3. For instance, the steering wheel interface module 20 may include a reset circuit in electrical communication with the processing unit 50 that reinitiates the processing unit 50 if the power supplied to the processing unit goes below a specified minimum operating voltage level. The reset circuit may also be used to reinitiate the processing unit 50 if the processing unit becomes stalled in executing its programmed instructions or otherwise becomes unresponsive. FIG. 3 also does not illustrate power inputs to each of the components that are typically powered by the vehicle's battery.

Figure 4:
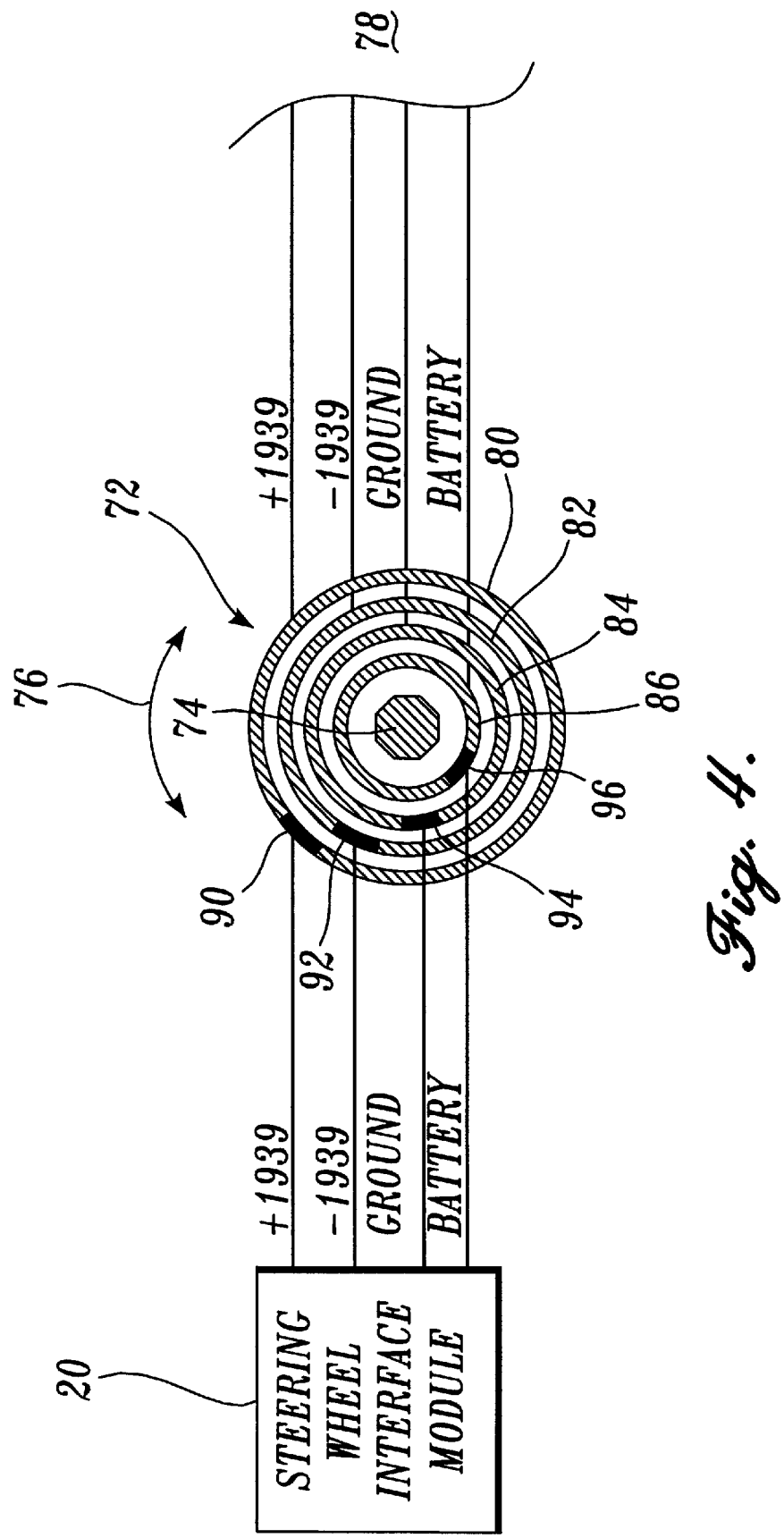
FIG. 4 is a pictorial diagram illustrating an embodiment of the invention using a slip ring assembly to connect a data communication bus in a vehicle with a data communication bus and a steering wheel interface module in the steering wheel assembly, as shown in FIG. 2.

As noted earlier, the data communication bus 24 is incorporated into the steering wheel assembly 10 to allow the steering wheel interface module 20 to directly transmit and receive data messages on the data bus. FIG. 4 illustrates a rotational connection assembly 72 that connects the bus lines of the data communication bus 24 to the data communication bus 26 in the vehicle. In FIG. 4, four concentric metal slip rings 80, 82, 84, and 86 are shown surrounding a section view of a steering wheel column 74. In practice, the slip rings 80, 82, 84, and 86 are secured to the steering wheel column 74 which is connected to the vehicle. The steering wheel assembly includes metal brushes 90, 92, 94 and 96 that rotate back and forth in the direction of arrows 76 when the steering wheel assembly is attached to the steering wheel column 74. The bus lines labeled +1939 and −1939 (i.e., for an SAE J1939 data bus) that form the data communication bus 24 connect from the steering wheel interface 20 to the metal brushes 90 and 92, respectively. The brushes 90 and 92 contact the metal slip rings 80 and 82 and maintain electrical connection with the slip rings 80 and 82 when the steering wheel assembly is rotated.

Electrical lines labeled Ground and Battery are also connected on one end to the steering wheel interface module 20 to provide a ground and a battery input voltage to the steering wheel interface module 20. The Ground and Battery lines are connected on the other end to the metal brushes 94 and 96, respectively, which contact the slip rings 84 and 86. The brushes 94 and 96 maintain an electrical connection with the slip rings 84 and 86 when the steering wheel assembly is rotated.

The slip rings 80, 82, 84, and 86 are electrically connected to the +1939 and −1939 bus lines and the Ground and Battery lines, respectively, that form the data communication bus 26 and extend throughout the vehicle 78. By using a slip ring assembly as shown in FIG. 4, the data communication bus 24 maintains a constant connection to the data communication bus 26, even through rotation of the steering wheel assembly.

The rotational connection assembly 72 shown in FIG. 4 is provided for exemplary purposes to demonstrate one actual embodiment of the invention. In other embodiments of the invention, the number of rings may be varied. For example, a three-ring brush and ring assembly may be used to connect the +1939 and −1939 bus lines and battery voltage through the steering wheel assembly 10. The ground line connected to the steering wheel interface module 20 may be connected to body of the steering wheel column 74, which may be used itself to provide a ground connection. Different numbers of rings may also be used to accommodate different types of data communication buses. Alternative embodiments of the invention may use other rotational connection assemblies, such as clock springs or rolled ribbons, to allow the steering wheel to rotate while maintaining a constant data bus connection in the steering wheel assembly 10.

By incorporating a data communication bus 24 into the steering wheel assembly 10, the present invention provides a number of advantages over the prior art. Communication via the data communication buses 24 and 26 minimizes the wiring needed from the steering wheel inputs 54 to the devices in the vehicle that correspond with the steering wheel inputs. Another advantage of the present invention is the programmability of the steering wheel interface module 20. Depending on the programmed instructions in the memory 52, the processing unit 50 may associate different functions with the steering wheel inputs 54. By modifying or adding to the programmed instructions stored in the memory 52 (which includes modifying or adding to the data messages stored in the memory 52), the processing unit 50 may be configured to output different data messages on the data communication bus 24 based on control information received from the steering wheel inputs 54. Accordingly, the functions of the steering wheel inputs 54 on the steering wheel assembly 10 are easily customized at the time of manufacture. The steering wheel interface module 20 may also be programmed or reprogrammed at a later time to add features or modifications to the functions of the steering wheel inputs 54.

The programmed instructions (including the data messages) stored in the memory 52 may be modified or supplemented by downloading new programmed instructions through an input port provided in the steering wheel interface module 20. The input port may be a separate input port for receiving programmed instructions or may comprise the communication connection between the steering wheel interface module 20 and the data communication bus 24. As noted earlier, the processing unit 50 is preferably capable of receiving data messages on the data communication bus 24 via the bus interface transceiver 60. To modify or supplement the programmed instructions in the memory 52, a service technician may connect to the data communication bus 24 (or the data communication bus 26 if the steering wheel assembly 10 is installed in the vehicle) and transmit data messages containing the new programmed instructions to the processing unit 50. When the processing unit 50 recognizes the data messages as containing new programmed instructions, the processing unit 50 stores the new programmed instructions in the memory 52. The new programmed instructions are then used by the processing unit 50 to control the operation of the steering wheel interface module 20.

As noted, the new programmed instructions may include new or modified data messages that are stored in the memory 52 to support the functions assigned to the steering wheel inputs 54. The collection of data messages stored in the memory 52 may include data messages that support all combinations of steering wheel inputs that may be installed in the steering wheel assembly. As a steering wheel input is added to the steering wheel assembly, the steering wheel interface module 20 is informed of the function of the steering wheel input, either by an electrical or mechanical coding on the steering wheel input as discussed earlier, or by specific programming instructions added to the memory 52 to identify the steering wheel input. In either regard, having a collection of data messages that already supports all combinations of steering wheel inputs, the steering wheel interface module 20 is prepared to output appropriate data messages on the data communication bus 24 that correspond with the steering wheel inputs installed in the steering wheel assembly.

While several embodiments of the invention have been described herein, it will be appreciated that various changes can be made without departing from the spirit and scope of the invention. For example, the data communication bus 24 incorporated into the steering wheel assembly may be one of many available types of data communication buses, other than an SAE J1939 data bus as shown in FIGS. 2 and 3. The present invention may also be adapted for use in light-duty vehicle applications. Furthermore, the embodiments of the invention described herein are shown using a centralized steering wheel interface module 20 that formulates data messages in response to the steering wheel inputs 54. Alternatively, steering wheel inputs may be used that each incorporate an individual steering wheel interface capable of transmitting data messages on the data communication bus 24 through individual connections to the data bus (i.e., the data communication bus 24 connects to each of the individual steering wheel inputs). The scope of the invention should therefore be determined from the following claims and equivalents thereto.

The embodiments of the invention in which an exclusive property or privilege is claimed are defined as follows:

1. A steering wheel assembly for use in a vehicle, comprising:
   (a) a steering wheel having a steering wheel hub adapted to be coupled to the vehicle;
   (b) a steering wheel input connected to the steering wheel hub;
   (c) a steering wheel interface module in the steering wheel hub having a communication connection with the steering wheel input for receiving control information from the steering wheel input and formulating a data message based on the control information; and
   (d) a data communication bus in the steering wheel hub adapted to be connected to a data communication bus in the vehicle, wherein the data communication bus in the steering wheel hub is connected to the steering wheel interface module for communicating the data message from the steering wheel interface module to the data communication bus in the vehicle.

2. The steering wheel assembly of claim 1, wherein the steering wheel input is directly connected to the steering wheel interface module.

3. The steering wheel assembly of claim 1, wherein the steering wheel interface module includes a processing unit and a memory in communication with the processing unit, wherein the processing unit formulates the data message in accordance with programmed instructions stored in the memory.

4. The steering wheel assembly of claim 3, wherein the programmed instructions are received on the data communication bus in the steering wheel hub and stored in the memory.

5. The steering wheel assembly of claim 3, wherein the memory includes a collection of data messages stored therein, and wherein the processing unit formulates the data message by accessing the collection of data messages and selecting a data message based on the control information received from the steering wheel input.

6. The steering wheel assembly of claim 5, wherein the collection of data messages includes a data message that is received on the data communication bus in the steering wheel hub and stored in the memory.

7. The steering wheel assembly of claim 3, wherein the memory is integrated with the processing unit.

8. The steering wheel assembly of claim 3, wherein the memory includes different types of memory, and the programming instructions are divided and stored in the different types of memory.

9. The steering wheel assembly of claim 1, wherein the data communication bus in the steering wheel hub is connected to the data communication bus in the vehicle through a slip ring connection.

10. The steering wheel assembly of claim 1, further comprising a steering wheel output having a communication connection with the steering wheel interface module for displaying status information received on the data communication bus in the steering wheel hub by the steering wheel interface module.

11. The steering wheel assembly of claim 10, wherein the steering wheel output is directly connected to the steering wheel interface module in the steering wheel hub.

12. The steering wheel assembly of claim 1, wherein the steering wheel interface module further includes a bus interface transceiver in communication with the processing unit and the data communication bus in the steering wheel hub, wherein the data message formulated by the processing unit is communicated to the bus interface transceiver and the bus interface transceiver transmits the data message on the data communication bus in the steering wheel hub.

13. The steering wheel assembly of claim 12, wherein the bus interface transceiver is configured to format the data message in accordance with a data transmission protocol that governs data transmission on the data communication bus.

14. The steering wheel assembly of claim 12, wherein the bus interface transceiver is integrated with the processing unit.

15. A method of interfacing a steering wheel input in a steering wheel assembly with a data communication bus in a vehicle, comprising;
    (a) providing a data communication bus in the steering wheel assembly;
    (b) connecting a steering wheel interface module to the steering wheel input and to the data communication bus in the steering wheel assembly;
    (c) connecting the data communication bus in the steering wheel assembly to the data communication bus in the vehicle;
    (d) formulating a data message in the steering wheel interface module based on control information received by the steering wheel interface module from the steering wheel input; and
    (e) transmitting the data message from the steering wheel interface module on the data communication bus in the steering wheel assembly to the data communication bus in the vehicle.

16. The method of claim 15, wherein the data communication bus in the steering wheel assembly is connected to the data communication bus in the vehicle through a slip ring connection.

17. The method of claim 15, further comprising providing a memory in the steering wheel interface module, wherein the steering wheel interface module formulates the data message in accordance with programmed instructions stored in the memory.

18. The method of claim 17, wherein the memory includes a collection of data messages stored therein, and wherein formulating the data message in the steering wheel interface module includes accessing the data message from the collection of data messages based on the control information received from the steering wheel input.

19. The method of claim 18, further comprising modifying the data message formulated in the steering wheel interface module by providing a new data message to be stored in the collection of data messages in the memory.

20. The method of claim 19, wherein the new data message is received on the data communication bus in the steering wheel assembly by the steering wheel interface module.

21. The method of claim 15, further comprising providing a bus interface transceiver in the steering wheel interface module, wherein transmitting the data message from the steering wheel interface module includes communicating the data message to the bus interface transceiver and transmitting the data message from the bus interface transceiver on the data communication bus in the steering wheel assembly.

22. The method of claim 21, further comprising formatting the data message in the bus interface transceiver according to a data transmission protocol that governs data transmission on the data communication bus in the steering wheel assembly.

23. A steering wheel interface module for use in a steering wheel assembly to interface a steering wheel input with a data communication bus in the steering wheel assembly, the steering wheel interface module comprising a processing unit and a memory in communication with the processing unit, the processing unit having a communication connection with the steering wheel input for receiving control information from the steering wheel input and formulating a data message based on the control information, the processing unit further having a communication connection with a bus interface transceiver that is connected to a data communication bus in the steering wheel assembly for transmitting the data message on the data communication bus in the steering wheel assembly.

24. The steering wheel interface module of claim 23, wherein the memory includes programmed instructions, and wherein the processing unit formulates the data message in accordance with the programmed instructions stored in the memory.

25. The steering wheel interface module of claim 24, wherein the programmed instructions are received on the data communication bus in the steering wheel assembly by the processing unit and stored in the memory.

26. The steering wheel interface module of claim 23, wherein the memory and the bus interface transceiver are integrated with the processing unit.

27. The steering wheel interface module of claim 23, wherein the memory includes a collection of data messages stored therein, and wherein the processing unit formulates the data message by accessing the collection of data messages and selecting a data message based on the control information received from the steering wheel input.

28. The steering wheel interface module of claim 27, wherein the collection of data messages includes a data message that is received on the data communication bus in the steering wheel assembly and stored in the memory.

29. The steering wheel interface module of claim 23, wherein the processing unit further has a communication connection with a steering wheel output in the steering wheel assembly for communicating status information to the steering wheel output.

* * * * *